C. P. HOSKINS.
MAIL BOX.
APPLICATION FILED NOV. 7, 1911.
1,048,409.
Patented Dec. 24, 1912.
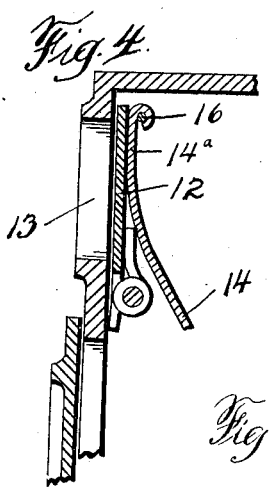
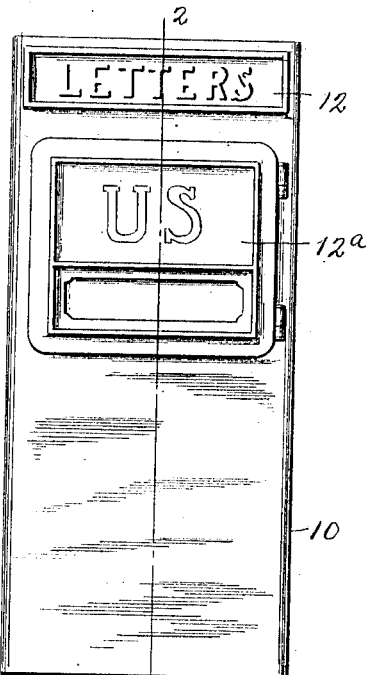
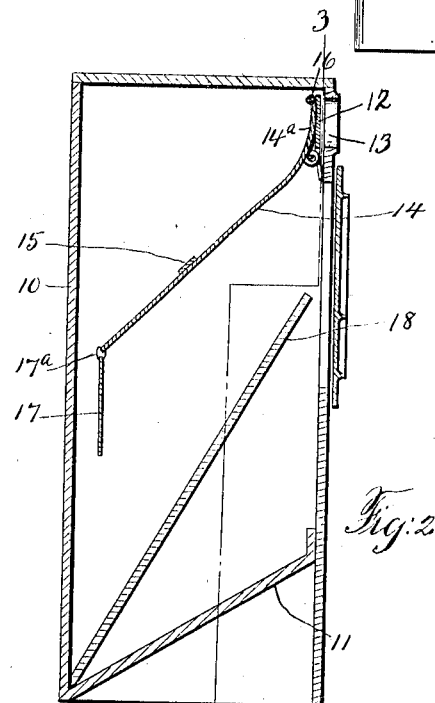
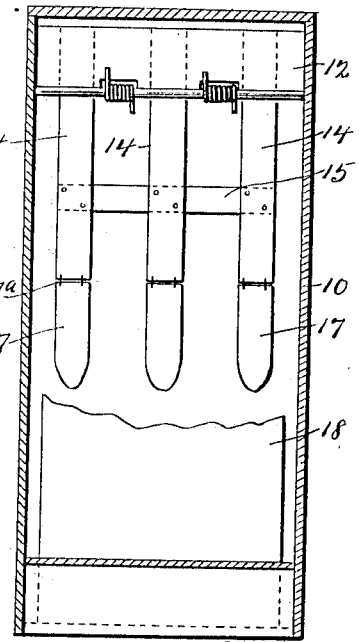

UNITED STATES PATENT OFFICE.

CLANMAR P. HOSKINS, OF NEW YORK, N. Y., ASSIGNOR TO WILLIAM R. GULICK, OF JERSEY CITY, NEW JERSEY, AND GEORGE F. CHIPPERFIELD, OF NEW YORK, N. Y.

MAIL-BOX.

1,048,409.   Specification of Letters Patent.   Patented Dec. 24, 1912.

Application filed November 7, 1911. Serial No. 658,962.

*To all whom it may concern:*

Be it known that I, CLANMAR P. HOSKINS, of the city, county, and State of New York, have invented a new and useful Improvement in Mail-Boxes, of which the following is a full, clear, and exact description.

My invention relates to improvements in mail boxes or letter boxes such as are used on streets and in public places as depositories for mail matter.

The object of my invention is to retain the ordinary style of letter box as far as possible, and yet apply to the box a simple device which will not get out of repair, which is very inexpensive, and which will effectually prevent the filching of mail matter from the box and through the fly opening thereof.

A common form of letter box has an opening at the top with a swinging fly which is hinged at the lower edge, and it sometimes happens that with a wire hook or similar device, valuable letters or packages will be abstracted from the box through this opening. In my invention, however, I provide a guard which is pivoted to the top of the fly and extends toward the back of the box, so that mail matter dropped through the fly will slide down over the guard, but where guards of an analogous nature have been used, they sometimes prevent the mail matter from falling forward below the guard, and interfere with the extraction of the mail by the letter carrier, or else they lie in such a position that they can be stolen as above stated. To obviate this difficulty I provide the guard with extension fingers which hang freely from its lower edge, which will absolutely prevent the mail matter from being pulled backward and upward by the fingers, but which will permit it to fall freely forward so as to lie below the guard where it cannot be stolen, and in an easy position to be removed through the door.

Reference is to be had to the accompanying drawings forming a part of this specification, in which similar reference characters indicate corresponding parts in all the views.

Figure 1 is a front elevation of a letter box embodying my invention. Fig. 2 is a vertical section on the line 2—2 of Fig. 1, and Fig. 3 is a vertical section on the line 3—3 of Fig. 2. Fig. 4 is a detail sectional view of the fly 12 and fingers 14.

The letter box 10 can be of any approved style or construction, and is preferably provided with an inclined bottom 11 which slides toward the back so that the mail matter in the box will slide down at the bottom and tip forward at the top. This, however, I do not claim as novel. The box is also provided with the customary fly 12 which is hinged at the bottom and covers the insertion opening 13 near the top of the box, and the box has the customary door $12^a$ for the removal of mail.

Attached to the fly 12 is a guard 14 preferably formed of several parallel members as shown best in Fig. 3, and these members are preferably bent near the top as at $14^a$ so as to lie flat against the fly 12 when the latter is closed, and this bending of the members 14 causes the body portions to extend backward and downward as shown in Fig. 2. The members 14 are united by a tie-plate 15, but obviously any desired number of these members 14 may be used, and even a single sheet of metal or the like would answer the purpose. The guard is pivoted as shown at 16 to the upper edge of the fly 12 so that it will swing freely and will hang loosely in the box when the fly is opened for the insertion of mail matter, thus permitting the letters and packages to fall freely downward in the box. To the lower edge of the guard, which in the present instance comprises several members 14, are attached the extension fingers 17 which hang like links from the guard, and are pivotally connected as shown at $17^a$, the connection being an exceedingly free one so that the fingers 17 will hang loosely as shown in Fig. 2. Obviously there will be as many of these fingers 17 as there are members 14, and any number from one up can be used.

When the mail matter is inserted in the box, the fly 12 is pushed back as usual, thus allowing the guard and its extension to also hang loose, and the mail matter drops behind the guard, but when the fly 12 springs up to close itself, or otherwise close the guard 14 and fingers 17 assume the position shown in Fig. 2, and the mail matter drops forward of the guard and lies as shown at 18 in Figs. 2 and 3. It will be observed that if any attempt is made to extract the mail matter 18 through the opening 13, it will be frustrated by the action of the guard 14 and fingers 17. It will be further observed that the device is very cheap and simple, and easily applied to ordinary mail boxes. This is an advantage because it does not involve the alteration of the type of box very generally used.

I claim:—

1. The combination with a letter box having an opening in the side thereof, and its closing fly having a hinge connection between the lower edge of the said fly and the side of the box so as to permit the fly to swing inward, of a guard pivoted to the fly on its inner surface near its free edge and bent so as to lie against the back of the fly and then extend downward and rearward when the fly is closed, and a jointed extension at the lower end of the guard.

2. In a letter box, a letter receptacle having a letter opening near its top, a fly adapted to normally close the said opening, said fly being hinged at the bottom, a guard pivotally mounted near the free edge of said fly, and extending rearwardly and terminating near the rear wall of said receptacle, fingers flexibly fixed to the free end of the said guard, said fingers adapted to swing rearwardly into engagement with the rear wall of the receptacle and prevent the removal of letters or other contents of the box by the insertion of instruments through the letter opening.

CLANMAR P. HOSKINS.

Witnesses:
ARTHUR G. DANNELL,
THOMAS T. SEELYE.

---

Copies of this patent may be obtained for five cents each, by addressing the "Commissioner of Patents, Washington, D. C."

Correction in Letters Patent No. 1,048,409

It is hereby certified that in Letters Patent No. 1,048,409, granted December 24, 1912, upon the application of Clanmar P. Hoskins, of New York, N. Y., for an improvement in "Mail-Boxes," were erroneously issued to William R. Gulick and George F. Chipperfield as assignees of the entire interest in said invention, whereas said Letters Patent should have been issued to the inventor *said Hoskins and William R. Gulick and George F. Chipperfield;* said Gulick and Chipperfield being assignees *of part interest* only, as shown by the records of assignments in this office; and that the said Letters Patent should be read with this correction therein that the same may conform to the record of the case in the Patent Office.

Signed and sealed this 28th day of January, A. D., 1913.

[SEAL.]

C. C. BILLINGS,
*Acting Commissioner of Patents.*